(12) United States Patent
Wike

(10) Patent No.: US 6,499,714 B1
(45) Date of Patent: Dec. 31, 2002

(54) SYSTEM FOR AND METHOD OF MOUNTING COMPRESSORS

(76) Inventor: John R. Wike, 699 May Dr., Jonesborough, TN (US) 37659

(*) Notice: Subject to any disclaimer, the term of this patent is extended or adjusted under 35 U.S.C. 154(b) by 0 days.

(21) Appl. No.: 09/970,098

(22) Filed: Oct. 4, 2001

(51) Int. Cl.$^7$ ............................................... F16M 13/00
(52) U.S. Cl. ...................................... 248/632; 248/634
(58) Field of Search ................................ 248/562, 566, 248/634, 678, 632

(56) References Cited

U.S. PATENT DOCUMENTS

| | | | | |
|---|---|---|---|---|
| 4,306,708 A | * | 12/1981 | Gassaway et al. | 267/141.3 |
| 4,522,378 A | * | 6/1985 | Nelson | 267/141.4 |
| 5,004,268 A | * | 4/1991 | Yamamoto | 280/804 |
| 5,131,619 A | * | 7/1992 | Daugherty et al. | 248/635 |
| 5,174,540 A | * | 12/1992 | Gilliam | 248/635 |
| 5,335,893 A | * | 8/1994 | Opp | 248/635 |
| 6,029,942 A | * | 2/2000 | Daddis, Jr. et al. | 248/635 |
| 6,157,345 A | * | 12/2000 | Hockett et al. | 343/715 |
| 6,190,134 B1 | * | 2/2001 | Hudson | 416/244 R |
| 6,354,558 B1 | * | 3/2002 | Li | 248/615 |

* cited by examiner

*Primary Examiner*—Leslie A. Braun
*Assistant Examiner*—A. Joseph Wujciak
(74) *Attorney, Agent, or Firm*—Walker, McKenzie & Walker PC

(57) ABSTRACT

A system for and method of mounting a machine to a base. A mounting bolt is provided for extending through the base, the mounting bolt includes a shaft having a first end and a second end, and an enlarged head attached to the second end of the shaft. A grommet having an aperture for receiving the shaft of the mounting bolt and having a groove for receiving the machine is provided. A nut attaches to the shaft of the mounting bolt adjacent the first end thereof to secure the grommet to the mounting bolt.

11 Claims, 2 Drawing Sheets

SYSTEM FOR AND METHOD OF MOUNTING COMPRESSORS

BACKGROUND OF THE INVENTION

1. Field of the Invention

The present invention relates, in general, to compressor mounting, and in particular, to a unique system for and method of mounting compressors in the base pans of window air conditioner units, condenser split air conditioning systems, and other types of air conditioner systems, and selected refrigerant coolers.

2. Description of the Related Art

The compressors of window air conditioning units, condenser split air conditioning systems, etc., are presently mounted to base pans using grommets and various fastening devices such as weld bolts, shoulder bolts, sleeve-bolt assemblies. These prior art fastening devices require welding through the base pan or driving down through the base pan. Presently, there are over 50 varieties of grommets and numerous bolt mount methods in use in the air conditioner condenser manufacturing companies.

None of known prior art fastening devices or methods, either singly or in combination, disclose or suggest the present invention. In general, nothing in the known prior art discloses or suggests a fastening system or method that mounts a compressor to a base pan by driving a bolt up through the base pan.

BRIEF SUMMARY OF THE INVENTION

The present invention provides a system for mounting a machine such as an air conditioner compressor or the like to a base such as a base pan of an air conditioner, etc. The system of the present invention includes a grommet for attachment to the machine, a mounting bolt for extending up through the base and the grommet, and a push nut for attachment to the mounting bolt to secure the grommet to the mounting bolt and to the base pan. The method of the present invention includes the steps of extending the shaft of a mounting bolt up through the base, attaching the machine to a grommet, then setting the grommet over the distal end of the shaft of the mounting bolt, then pushing a push nut onto the distal end of the shaft of the mounting bolt.

It is an object of the present invention to provide an improved system for and method of mounting an air conditioner compressor to a base pan, etc.

It is anticipated that the present invention could be used in any cooling device now being manufactured.

While the present invention combines a little of present and past fastening devices such as weld bolts, shoulder bolts, sleeve-bolt assemblies, some welding through the base pan and some driving down through the base pan, one object of the present invention is to provide a system that makes sleeves, shoulder bolts, and welding of weld bolts obsolete in the mounting of air conditioning compressors, and permits the use of pre-painted sheet metal, which can result in economic savings in welding and painting equipment.

Another object of the present invention is to provide a mounting bolt that is a combination threaded or knurled bolt and stud, and that is threaded or pushed up-through an extruded hole in a base pan.

Another object of the present invention is to provide such a mounting bolt having serrations and/or seal rings under the bolt head to prevent thread stripout and water leaks in window unit base pans, using the splash cooling reservoir in the pan.

Another object of the present invention is to provide such a mounting bolt in a standard length to fit many compressor sizes from 1 ton through 5 tons.

Another object of the present invention is to provide a rubber grommet isolator between the compressor and the mounting bolt, and a push nut for setting on the stud portion of the bolt on top of the grommet, after the compressor is set in place on the grommet and the grommet is set on the stud portion of the bolt, to keep the compressor secure in place.

Another object of the present invention is to provide a mounting method that can be marketed as a system consisting of a bolt-stud, a rubber grommet isolator, and a push nut, all being provided by one vendor.

Another object of the present invention is to provide a cost reduction goal of 25% over present compressor mounting systems and methods.

Another object of the present invention is to provide standardization of bolt and grommet design and sizes, with one bolt-stud fitting all compressors from 1 ton through 5 ton and possibly larger, and with three sizes of grommets satisfying the needs of all major air conditioner manufactures. Thus, another object of the present invention is to allow inventories to be reduced, eliminate stock outages, reduce manufacturing and component costs, and improve performance.

Another object of the present invention is to provide a mounting bolt having a reduced diameter from previous mount bolts, and having a universal or standard length.

Another object of the present invention is to provide a grommet having a universal or standard height, regardless of diameter or indentation hardness (durometer) range, and a peculiar inner bore that tapers from the bottom of the grommet to allow the grommet to slide down over the mount bolt with ease and no interruption or "hang up" between bolt and grommet inner bore while the assembly is being completed on the manufacturing plant floor, and that does not grip or surround the mount bolt over the full height of the grommet bore. This relief from grommet inner bore full contact with the mount bolt reduces the possibilities of vibration sound transfer or noise levels.

Another object of the present invention is to provide a mounting system that allows all compressor lines, tubes, and attachments to be dimensionally identical for compressors by locating the mount foot in the same position (height) on all compressors up to 5 ton capacity, with one mounting bolt size and length accepting all compressors up to 5 ton capacity.

Another object of the present invention is to provide a mounting system having a bolt engagement method with the bolt head locking into the underside of the base pan to provide absolute, positive thread or knurl engagement with no possibility of the bolt thread or knurl ever stripping out of the base, or loosening.

Another object of the present invention is to provide a air conditioner compressor mounting system that allows base pans to be formed out of thinner material than prior art mounting systems, and out of prepainted sheet metal.

Another object of the present invention is to provide a mounting system including a mounting bolt with shaft or shank having an unthreaded distal end, a grommet for being merely pushed over the unthreaded distal end of the bolt shaft, and a push nut for being pushed over the unthreaded distal end of the bolt shaft on top of the grommet to allow for easy assembly thereof.

Another object of the present invention is to provide such a mounting system which allows easy service work and compressor replacement by merely cutting the push nut with one cut of side clipping pliers, and lifting the compressor off the unthreaded distal end of the bolt shaft, and using a new push nut to replace the compressor, without danger of stripping bolt threads out of the base pan hole and without having to replace bolts and nuts with removing and/or replacing compressors.

Another object of the present invention is to provide such a mounting system in which the push nut is a common, in stock item that any serviceperson can remove with side cutter pliers, and obtain a new replacement part from hardware or industrial supply houses.

Another object of the present invention is to provide such a mounting system having a push nut with 100–300 pounds strip off torque per stud and minimal 14–25 pound push on by hand, on the manufacturing assembly line.

Another object of the present invention is to provide such a mounting system having a push nut which will pass any drop test and vibration test performed to assure positive compressor containment during transportation to market.

Another object of the present invention is to provide such a mounting system having a push nut which will allow hand pressure installation down on top of the grommet in the manufacturing process, and still not interfere with sound deadening or allow sound transmission through the isolator grommet due to the spring steel form of the push nut.

Another object of the present invention is to provide such a mounting system having three grommet sizes to provide three durometer ranges, with all dimensions of the three different size grommets being identical except for the body diameter which increases by ⅛ inch (0.3175 centimeters) between sizes, and physical characteristics such as a peculiar inner bore design and formed cap relief for aiding installation as described herein.

DETAILED DESCRIPTION OF THE INVENTION

Figure 1:
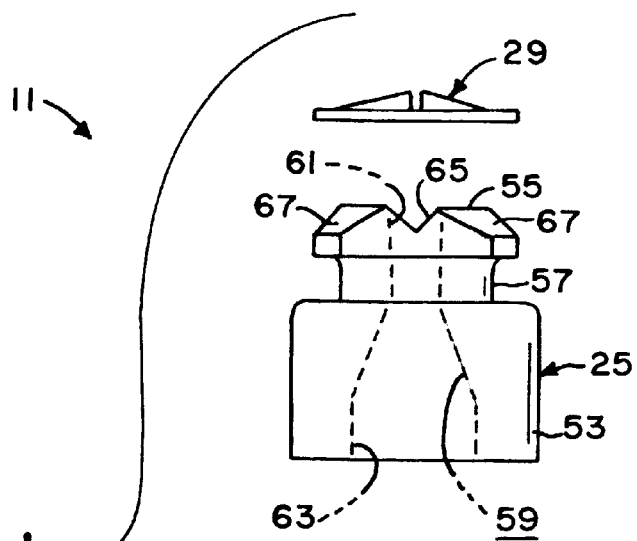
FIG. 1 is an exploded elevational view of a preferred embodiment of the mounting system of the present invention.
Figure 2:
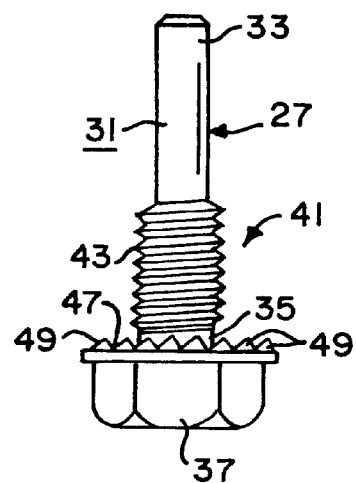
FIG. 2 is a perspective view of a push nut of the mounting system of FIG. 1.
Figure 3:
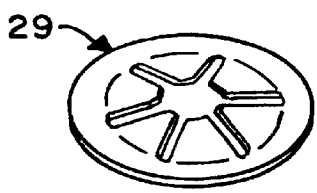
FIG. 3 is a top plan view of a grommet of the mounting system of FIG. 1.
Figure 4:
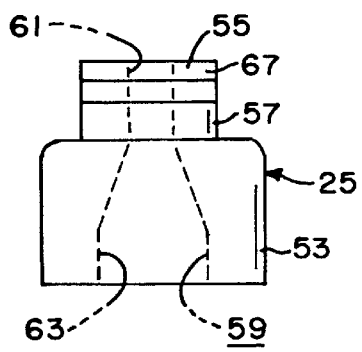
FIG. 4 is an end elevational view of the grommet of FIG. 3.
Figure 5:
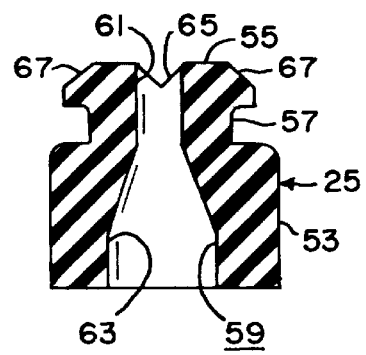
FIG. 5 is a sectional view substantially as taken on line 5—5 of FIG. 3.
Figure 6:
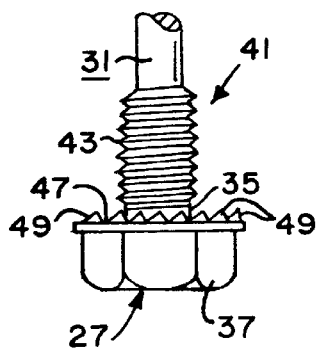
FIG. 6 is a front elevational view of the head end of a mounting bolt of the mounting system of FIG. 1.

Preferred embodiments of various components of the mounting system 11 of the present invention are shown in FIGS. 1–9. The system 11 is used to mount a machine, preferably an air conditioner compressor 13, to a foundation or base, preferably a base pan 15 of an air conditioner system.

The compressor 13 preferably includes a plurality of mounting lugs or feet 17 with each foot 17 having a hole 19 therethrough for use in mounting the compressor 13 to the base pan 15. A standard industry compressor 13 has 3 or 4 feet 17 for mounting the compressor 13 to the base pan 15. The base pan 15 has a hole 21 therethrough for alignment with the hole 19 in each foot 17 when the compressor 13 is mounted thereto. Each hole 21 may be extruded into the base pan 15 and an upwardly recessed area or well 23 may be formed in the base pan 15 around each hole 21 (see FIG. 9). As now apparent to those skilled in the art, a separate mounting system 11 is used to mount each foot 17 of the compressor 13 to the base pan 15.

The system 11 includes, in general, a grommet 25 for attachment to a foot 17 of the compressor 13, a mounting bolt 27 for extending up through a hole 21 in the base pan 15 and through the grommet 25, and a nut 29 for securing the grommet 25 to the mounting bolt 27.

The nut 29 preferably consist of an off-the-shelf push-on nut or fastener such as a standard ¼ inch (0.635 centimeter) Palnut® or Tinnerman® brand push-on nut manufactured by TransTechnology Engineered Components, LLC, P.O. Box 10, Brunswick, Ohio 44212-0010, etc. Such universal push-on nuts are common, stock items that can be easily obtained from hardware or industrial supply houses, etc. The nut 29 preferably has a relative high strip off torque or removal resistance of, for example, 100–300 pounds, and a low or minimal push on pressure or force of, for example, 14–25 pounds, so that the nut 29 can be easily and quickly installed (pushed on the mounting bolt 27) with simple hand pressure on a manufacturing assembly line or the like, while being secure and vibration resistant once installed. Removal of the nut 29 is most appropriately done by merely cutting the nut 29 with standard side cutter pliers, and replacing with a new replacement part.

Figure 7:
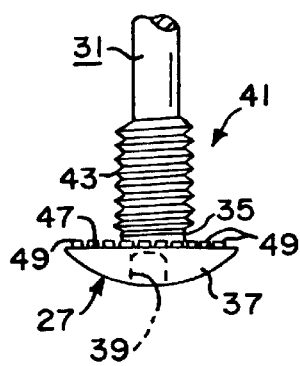
FIG. 7 is a front elevational view of the head end of an alternate embodiment of a mounting bolt of the mounting system of the present invention.
Figure 8:
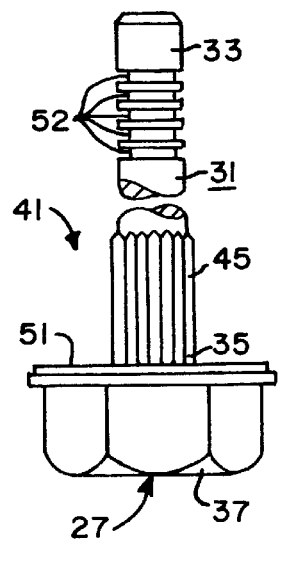
FIG. 8 is a front elevational view of another alternate embodiment of a mounting bolt of the mounting system of the present invention.
Figure 9:
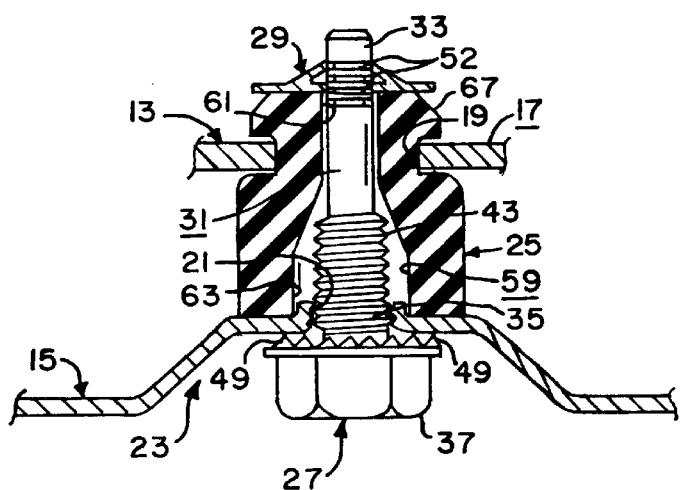
FIG. 9 is an assembly view of the mounting system of FIG. 1, showing another alternate embodiment of a mounting bolt and shown in combination with portions of an air conditioner compressor and a base pan of an air conditioning system.

The bolt 27 includes an elongated shank or shaft 31 having a first end 33 and a second end 35, and an enlarged head 37 attached to the second end 35 of the shaft 31. The head 37 may be a typical hexagon head as shown in FIGS. 1, 6, 8 and 9, or may be a standard round or truss head having a drive socket 39 therein (e.g., a hexagonal or square shaped socket, etc.) as shown in FIG. 7, etc.

The bolt 27 preferably includes grip means 41 for gripping the base pan 15 when the shaft 31 of the bolt 27 extends through the hole 21 in the base pan 15. The grip means 27 may include an externally threaded portion 43 on the second end 35 of the shaft 31 (see FIGS. 1, 6, 7 and 9) for screwing into the edge of the base pan 15 about the hole 21 when the shaft 31 of the bolt 27 is rotated or screwed up through the hole 21 in the base pan 15. Optionally, the grip means 27 may include a knurled or ribbed-neck or shoulder portion 45 on the second end 35 of the shaft 31 (see FIG. 8) for gripping the edge of the base pan 15 about the hole 21 when the shaft 31 of the bolt 27 is pressed or pushed up through the hole 21 in the base pan 15. The head 37 of the bolt 27 preferably has a face surface 47 for engaging the base pan 15 when the shaft 31 of the bolt 27 extends through the hole 21 in the base pan 15, and the grip means may include braking serrations 49 (see FIGS. 1, 6 and 9) on the face surface 47 of the head 37 for gripping the underside of the base pan 15 when the shaft 31 of the bolt 27 extends through the hole 21 in the base pan 15. Alternatively, the grip means may include a seal ring 51

(see FIGS. 7 and 8) at or formed in the face surface 47 of the head 37 to grip the underside of the base pan 15 when the shaft 31 of the bolt 27 extends up through the hole 21 in the base pan 15.

The shaft 31 of the bolt 27 may have one or more annular grooves 52 adjacent the first end 33 thereof (see FIGS. 8 and 9) for enhancing the attachment of the nut 29 to the shaft 31, making the fixing of the nut 29 to the shaft 31 more secure. More specifically, the shaft 31 of the bolt 27 may have five annular grooves 52 formed therein. The push-on nut 29 will lock into one or more of the grooves 52 as it is pushed down the shank or shaft 31 to increase the strip off torque or removal resistance of the nut 29 without increasing the push on pressure or force thereof.

The grommet 25 has a body 53, a cap or head 55, and a narrowed part or neck 57 extending between the body 53 and head 55. The narrowed part or neck 57 is designed to extend through the hole 19 in the foot 17 of the compressor 13 and coacts with the body 53 and head 55 to form a groove or slot for receiving portions of the foot 17 of the compressor 13 adjacent the hole 19. The grommet 25 has an axial hole or aperture 59 therethrough for loosely receiving a portion of the shaft 31 of the mounting bolt 27. The aperture 59 has a first end 61 that exits the head 55, and a second end 63 that exits the body 53. The aperture 59 is preferably tapered with the second end 63 of the aperture 59 preferably enlarged to slide freely over the threaded portion 43 or knurled portion 45 of the bolt 27, while the first end 61 of the aperture 59 is sized to allow grommet 25 to just slide over and align with the first end 33 of the shaft 31 of the bolt 27. A relief cut or groove 65 is preferably formed or extends across the head 55 of the grommet 25 to allow the head 55 to easily compress or fold when being inserted through the hole 19 in the foot 17 of the compressor 13, etc. The head 55 may have flat side portions extending tangentially relative to the neck 57 and end portions that extending outwardly relative to the neck 57. The outer end portions of the head 55 preferably have bevelled upper edges 67 which also aid the insertion of the head 55 through the hole 19.

The individual components of the system 11 can be manufactured in various manners, out of various materials, and in various sizes as will now be apparent to those skilled in the art. As hereinabove stated, the nut 29 is preferably an off-the-shelf push-on nut sized to fit the shaft 31 of the bolt 27.

The bolt 27 is preferably a universal size to fit all air conditioner compressors up to 5 tons. Thus, for example, the shaft 31 of the bolt 27 may have a total length of approximately 1.750 inches (4.445 centimeters), with the threaded portion 43 or knurled portion 45 having a length of approximately 0.0.375 inches (0.9525 centimeters), and with the first end 33 thereof having a diameter of approximately 0.240 inches (0.6096 centimeters). The grooves 52 in the shaft 31 may start approximately 1.293 inches (3.28422 centimeters) from the face surface 47 of the head 37, with each groove 52 having a width of 0.025 inches (0.0635 centimeters) and a depth of 0.020 inches (0.0508 centimeters), and spaced from one another a distance of 0.025 inches (0.0635 centimeters). The threaded portion 43 may be approximately 0.0.3125 inches (0.79375 centimeters) in diameter with approximately 8 threads per inch to provide in excess of 150 inch pounds of thread stripout torque in an extruded hole diameter of 0.265–0.270 inch (0.6731–0.6858 centimeter). The head 37 may be a 0.500 (1.27 centimeter) indented hex washer head, a 0.6875 inch (1.74625 centimeter) diameter truss head, etc. The bolt 27 may be zinc yellow plated and hardened to SAE J 933, equivalent to grade 5.

The grommet 25 is preferably constructed from a vibration isolating material. For example, the grommet 25 can be molded or otherwise constructed out of rubber. The grommet 25 is almost universal in size, having a total height of approximately 1.3125 inches (3.33375 centimeters). The head 55 preferably has a length of approximately 1 inch (2.54 centimeters), a width of approximately 0.75 inch (1.905 centimeters), and a height of approximately 0.25 inches (0.635 centimeters). The neck 57 preferably has a diameter of approximately 0.75 inch (1.905 centimeters), and a height of approximately 0.160 inches (0.4064 centimeters). The diameter of the body 53 preferably varies to provide different indention hardness or durometer ranges. Thus, the body 53 may have a diameter of 1.250 inches (3.175 centimeters) to provide a durometer range of 35–45, a diameter of 1.375 inches (3.4925 centimeters) to provide a durometer range of 45–55, or a diameter of 1.5 inches (3.81 centimeters) to provide a durometer range of 55–65. Indicia (not shown) such as the numeral 1, 2 or 3 is preferably cast or molded into the top of each grommet 25 to identify a certain size and durometer range, to provide accurate and positive grommet size or indentation hardness identification and eliminate mixing of different size grommets 25 in plant operation.

The method of mounting a compressor 13, or the like, to a base pan 15, or the like, using the system 11 of the present invention is quite simple. A hole 21 is extruded or otherwise formed in the base pan 15 location where it is desired to attach the compressor 13 using the system 11. The first end 33 of the shaft 31 of the mounting bolt 27 is extended "up-through" the hole 21 in the base pan 15 by "screwing" with respect to a mounting bolt 27 having a threaded portion 43 or by "pressing" with respect to a mounting bolt 27 having a knurled portion 45, etc. Using a hole 21 diameter of 0.265–0.275 inches (0.6731–0.6985 centimeters), allows the threaded portion 43 to drive, form threads and seat at low torque driving values and have excellent thread engagement in an extruded hole 21 while causing the shaft 31 of the mounting bolt 27 to be perfectly aligned for compressor setting, without danger of bending the base pan 15 with heavy driving force, and keeping the shaft 31 of the bolt 27 aligned, or perpendicular to the base pan 15. The head 55 of the grommet 25 is pushed through the hole 19 in the foot 17 of the compressor 13. The relief cut or groove 65 in the head 55 allows the head 55 to easily compress or fold as it is pushed up through the hole 19 while the bevelled edges 67 thereof help align the head 55 in the hole 19. After the head 55 is pushed up through the hole 19, it will spring back and the foot 17 will be trapped within the neck 57 of the grommet 25, between the head 55 and body 53 thereof. Next, the grommet 25 is set down over and onto the first or distal end 33 of the shaft 31 of the bolt 27. Then, the push nut 29 is merely pushed onto the first or distal end 33 of the shaft 31 of the bolt 27, thereby securing the grommet 25 to the bolt 27, etc. Thus push nut 29 thus locks the assembly together to prohibit the compressor foot 17 from coming up out of and over the top of the grommet 25 in shipment or some special horizontal installation. The push nut 29 does not secure the bolt 27 to the base pan 15; the grip means 41 of the mounting bolt 27 (e.g., the threaded portion 43 or knurled portion 45) secures the mounting bolt 27 to the base pan 15.

As thus constructed and used, the present invention provides a new approach to compressor mounting in base pans of window units, condenser split systems and other types of air conditioning systems. Tests have given the present invention in excess of 150 inch pounds of thread stripout torque in extruded hole diameters of 0.260–0.270 inch (0.6604–0.6858 centimeters), on the installed bolt-stud, with driving and seating torque below 65 inch pounds. Advantages provided by the universal mounting bolt of the mounting system of the present invention include: (1) a single mounting bolt size to fit all compressor sizes up to 5 ton compressors, (2) low driving seating torque when driving the mounting bolt up through a base pan, (3) positive engagement between the threaded or knurled portion of the proximal end of the bolt shaft which reduces any chances of thread strip out between the mounting bolt and base pan, (4) no thread on the distal end of the bolt shaft to allow the compressor and grommet combination to slide down over the bolt shaft with no "hang up," (5) the bolt head seats under the base pan with a positive lock which prevents bolt failure due to back-out of threads, (6) the use of a seal ring under the bolt head prevents water leakage out of the base pan in window units using splash cooling of compressors, (7) the need for and cost of a sleeve about the bolt shaft is eliminated, (8) the need for and cost of welding molting bolts to the base pan is eliminated, (9) the need for and cost of welding machines is eliminated, (10) the need to stock multiple lengths of bolts and sleeves is eliminated, (11) inventory costs are reduced, (12) prepainted steel sheet metal base pans can be used, and (13) base pans out of thin sheet metal can be used. Advantages provided by the standard push nut of the mounting system of the present invention include: (1) installs by slight hand pressure (e.g., 14–25 pounds), (2) has high strip off torque (e.g., 100–300 pounds for each mounting bolt, (3) replacement push nuts are readily available, and (4) allows simple field service by merely removing and replacing the push nut without requiring bolt, nut and/or sleeve replacement. Advantages provided by the almost universal grommet design of the mounting system of the present invention include: (1) requires only three sizes of grommets to meet all standard durometer ranges, (2) all grommet dimensions are identical except for the base diameter which increases in 1/8 inch increments for each step up in durometer range, (3) the unique grommet head relief cut design allows for easy installation of the grommet into the foot of the compressor, (4) the unique grommet inner bore design allows for easy installation of the grommet-compressor combination down over the distal end of the mounting bolt, (5) reduces the size of required stock inventories, and (6) identity indicia (e.g., numbers) can be molded into the top of the grommets to provide accurate and positive grommet size identification and eliminates mixes in plant operation.

Although the present invention has been described and illustrated with respect to a preferred embodiment and a preferred use therefor, it is not to be so limited since modifications and changes can be made therein which are within the full intended scope of the invention.

What is claimed is:

1. A system for mounting a machine to a base, said system comprising:

(a) a grommet having a circumferential groove for receiving said machine and having an aperture; said aperture having a first end portion extending upward from a transverse plane across said aperture through said circumferential groove and having a second end portion extending downward from a transverse plane across said aperture below said circumferential groove; said first and second end portions of said aperture having cross sectional diameters; said cross sectional diameter of said second end portion of said aperture being larger than said cross sectional diameter of said first end portion thereof;

(b) a mounting bolt for extending up through said base and said aperture of said grommet, said mounting bolt including a shaft having a first end for positioning within said first end portion of said aperture and having a second end for positioning within said second end portion of said aperture, an enlarged head attached to said second end of said shaft, and grip means on said second end of said shaft for gripping said base when said shaft of said mounting bolt extends up through said base; said first and second ends of said shaft having cross sectional diameters; said cross sectional diameter of said second end of said shaft being larger than said cross sectional diameter of said first end thereof; said cross sectional diameter of said first end of said shaft being sized to just slide into and align with said first end of said aperture of said grommet; said cross sectional diameter of said second end of said shaft being sized to slide freely into said second end of said aperture of said grommet; and (c) a nut for attachment to said shaft of said mounting bolt adjacent said first end thereof to secure said grommet to said mounting bolt.

2. The system of claim 1 in which said grip means includes external threads on said second end of said shaft of said mounting bolt.

3. The system of claim 1 in which said grip means includes knurls on said second end of said shaft of said mounting bolt.

4. The system of claim 1 in which said enlarged head of said mounting bolt has a face surface for engaging said base when said shaft of said mounting bolt extends through said base; and in which said grip means includes serrations on said face surface of said enlarged head of said mounting bolt.

5. The system of claim 1 in which said shaft of said mounting bolt has a plurality of annular grooves adjacent said first end thereof for enhancing the attachment of said nut to said shaft of said mounting bolt.

6. The system of claim 1 in which said grommet is constructed from a vibration isolating material.

7. The system of claim 6 in which said vibration isolating material is rubber.

8. The system of claim 1 in which said aperture of said grommet is tapered between said second end and said first end.

9. The system of claim 1 in which said grommet includes a head having a relief groove extending there across.

10. In combination with an air conditioning compressor and a base pan, a system mounting said air conditioning compressor to said base pan, said air conditioning compressor having a foot portion; said system comprising:

(a) a rubber grommet having a head portion, a body portion positioned on top of said base pan, a neck portion joining said head portion of said grommet to said body portion thereof and extending through said hole in said foot portion of said air conditioning compressor, and an aperture extending up through said body portion, said neck portion, and said head portion of said grommet; said neck portion of said grommet having a cross sectional area smaller than said cross sectional areas of said head portion and said body portion of said grommet to form a groove portion between said head portion and said body portion of said grommet with said foot portion of said air conditioning compressor trapped within said neck portion between said head portion and said body portion of said grommet; said aperture having a first end portion extending upward from a transverse plane across said aperture through said groove portion and having a second end portion extending downward from a transverse plane across said aperture below said groove portion; said first and second end portions of said aperture having cross sectional diameters; said cross sectional diameter of said second end portion of said aperture being larger than said cross sectional diameter of said first end portion thereof;

(b) a mounting bolt having a shaft extending up through said base pan and through said aperture of said grommet; said mounting bolt including a shaft having a first end for positioning within said first end portion of said aperture and having a second end for positioning within said second end portion of said aperture, an enlarged head attached to said second end of said shaft, and grip means on said second end of said shaft gripping said base; said first and second ends of said shaft having cross sectional diameters; said cross sectional diameter of said second end of said shaft being larger than said cross sectional diameter of said first end thereof; said cross sectional diameter of said first end of said shaft being sized to just slide into and align with said first end of said aperture of said grommet; said cross sectional diameter of said second end of said shaft being sized to slide freely into said second end of said aperture of said grommet; and (c) a push nut attached to said shaft of said mounting bolt securing said grommet to said mounting bolt.

11. A method of mounting an air conditioning compressor having a foot portion to a base pan, said method comprising the steps of:

(a) providing a grommet having a circumferential groove for receiving said foot portion and having an aperture; said aperture having a first end portion extending upward from a transverse plane across said aperture through said circumferential groove and having a second end portion extending downward from a transverse plane across said aperture below said circumferential groove; said first and second end portions of said aperture having cross sectional diameters; said cross sectional diameter of said second end portion of said aperture being larger than said cross sectional diameter of said first end portion thereof;

(b) providing a mounting bolt for extending up through said base pan and said aperture of said grommet, said mounting bolt including a shaft having a first end for positioning within said first end portion of said aperture and having a second end for positioning within said second end portion of said aperture, an enlarged head attached to said second end of said shaft, and grip means on said second end of said shaft for gripping said base pan when said shaft of said mounting bolt extends through said base pan; said first and second ends of said shaft having cross sectional diameters; said cross sectional diameter of said second end of said shaft being larger than said cross sectional diameter of said first end thereof; said cross sectional diameter of said first end of said shaft being sized to just slide into and align with said first end of said aperture of said grommet; said cross sectional diameter of said second end of said shaft being sized to slide freely into said second end of said aperture of said grommet;

(c) extending said shaft of said mounting bolt up through said base pan until said grip means on said second end of said shaft grips said base pan and attaches said mounting bolt to said base pan;

(d) attaching the foot portion of said air conditioning compressor to a grommet;

(e) then passing said grommet over said shaft of said mounting bolt; and (f) then pushing a push nut onto said shaft of said mounting bolt to secure said grommet to said mounting bolt.

* * * * *